United States Patent
Kim et al.

(10) Patent No.: US 9,471,274 B2
(45) Date of Patent: *Oct. 18, 2016

(54) MOBILE TERMINAL AND CONTROLLING METHOD THEREOF

(71) Applicant: LG ELECTRONICS INC., Seoul (KR)

(72) Inventors: Jonghwan Kim, Seoul (KR); Jeongwon Hwang, Seoul (KR); Minkyeong Kim, Seoul (KR); Kyungjin Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/961,466

(22) Filed: Dec. 7, 2015

(65) Prior Publication Data

US 2016/0092161 A1    Mar. 31, 2016

Related U.S. Application Data

(63) Continuation of application No. 14/069,820, filed on Nov. 1, 2013, now Pat. No. 9,207,906.

(30) Foreign Application Priority Data

Nov. 1, 2012   (KR) .................. 10-2012-0123038

(51) Int. Cl.
| | |
|---|---|
| *H04B 1/38* | (2015.01) |
| *G06F 3/16* | (2006.01) |
| *G10L 15/26* | (2006.01) |
| *H04M 1/725* | (2006.01) |
| *G06F 17/21* | (2006.01) |
| *G06F 3/041* | (2006.01) |

(52) U.S. Cl.
CPC .............. *G06F 3/167* (2013.01); *G06F 3/0416* (2013.01); *G06F 17/21* (2013.01); *G10L 15/26* (2013.01); *H04M 1/72547* (2013.01); *H04M 2250/74* (2013.01)

(58) Field of Classification Search
CPC ................................ G06F 3/167; G06F 17/21
USPC ....... 455/563, 566, 67.7; 704/200, 206, 208, 704/214, 233, 235
See application file for complete search history.

(56) References Cited

U.S. PATENT DOCUMENTS

| | | | |
|---|---|---|---|
| 6,173,259 B1 | 1/2001 | Bijl et al. | |
| 7,089,270 B2 | 8/2006 | Ren et al. | |
| 8,452,341 B2 * | 5/2013 | Oh | G06F 3/038 455/566 |
| 8,473,297 B2 * | 6/2013 | Jang | H04M 1/72561 704/235 |
| 8,543,394 B2 * | 9/2013 | Shin | G06F 1/1624 704/231 |
| 2005/0240406 A1 | 10/2005 | Carroll | |
| 2006/0217159 A1 | 9/2006 | Watson | |
| 2009/0124272 A1 | 5/2009 | White et al. | |
| 2014/0208209 A1 * | 7/2014 | Na | G06F 3/167 715/728 |
| 2015/0065200 A1 * | 3/2015 | Namgung | G06F 3/167 455/566 |

* cited by examiner

*Primary Examiner* — Sonny Trinh
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a microphone configured to receive a first voice input; a touchscreen display; a controller configured to convert the first voice input into first text, display the first text on the touchscreen display, receive a selection signal indicating a selection of the displayed first text, receive a second voice input via the microphone, convert the second voice input into second text, combine the first text and the second text, and display the combined text on the touchscreen display.

28 Claims, 14 Drawing Sheets

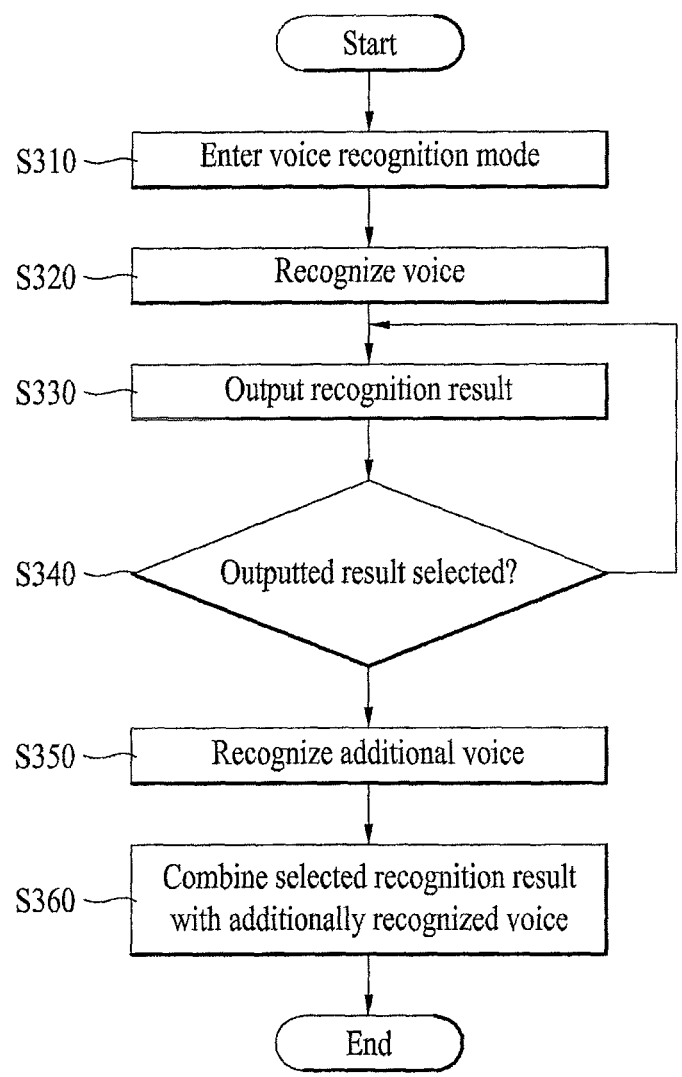

MOBILE TERMINAL AND CONTROLLING METHOD THEREOF

CROSS-REFERENCE TO RELATED APPLICATIONS

This application is a Continuation of U.S. application Ser. No. 14/069,820, filed on Nov. 1, 2013 (now U.S. Pat. No. 9,207,906, issuing Dec. 8, 2015), which claims priority under 35 U.S.C. §119(a) to Application No. 10-2012-0123038, filed in Korea on Nov. 1, 2012, all of which are hereby expressly incorporated by reference into the present application.

BACKGROUND OF THE INVENTION

1. Field of the Invention

The present invention relates to a mobile terminal, and more particularly, to a mobile terminal and controlling method thereof.

2. Discussion of the Related Art

Generally, terminals can be classified into mobile/portable terminals and stationary terminals. The mobile terminals can be further classified into handheld terminals and vehicle mount terminals. As functions of the terminal are becoming diversified, the terminal tends to be implemented as a multimedia player provided with composite functions such as photographing of photos or videos, playback of music or video files, game play, broadcast reception and the like for example.

Recently, a terminal tends to provide various functions through a voice recognition function. The demands for more convenient voice recognition functions are also increasingly rising.

SUMMARY OF THE INVENTION

Accordingly, one aspect of the present invention is to provide a mobile terminal and controlling method thereof that substantially obviate one or more problems due to limitations and disadvantages of the related art.

An object of the present invention is to provide a mobile terminal and controlling method thereof, by which a more convenient voice recognition function can be provided.

Another object of the present invention is to provide a mobile terminal and controlling method thereof, by which information corresponding to a previously recognized voice is modified to enable various side functions.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention may include a microphone, a touchscreen, and a controller displaying a recognition result of each of at least one user voice input via the microphone in a voice recognition mode on the touchscreen, the controller, if a user voice is additionally input via the microphone while one of the at least one recognition result is selected, processing the selected recognition result in a manner of combining the selected recognition result with a recognition result of the additionally input user voice.

In another aspect of the present invention, a method of controlling a mobile terminal according to one embodiment of the present invention may include the steps of entering a voice recognition mode, receiving an input of at least one user voice input via a microphone, displaying a recognition result of each of the input at least one user voice on a touchscreen, receiving an input for selecting one of the at least one recognition result, and if a user voice is additionally input via the microphone while the one of the at least one recognition result is selected, processing the selected recognition result in a manner of combining the selected recognition result with a recognition result of the additionally input user voice.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a flowchart illustrating one example of a method of processing voice recognition results conjointly according to one embodiment of the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
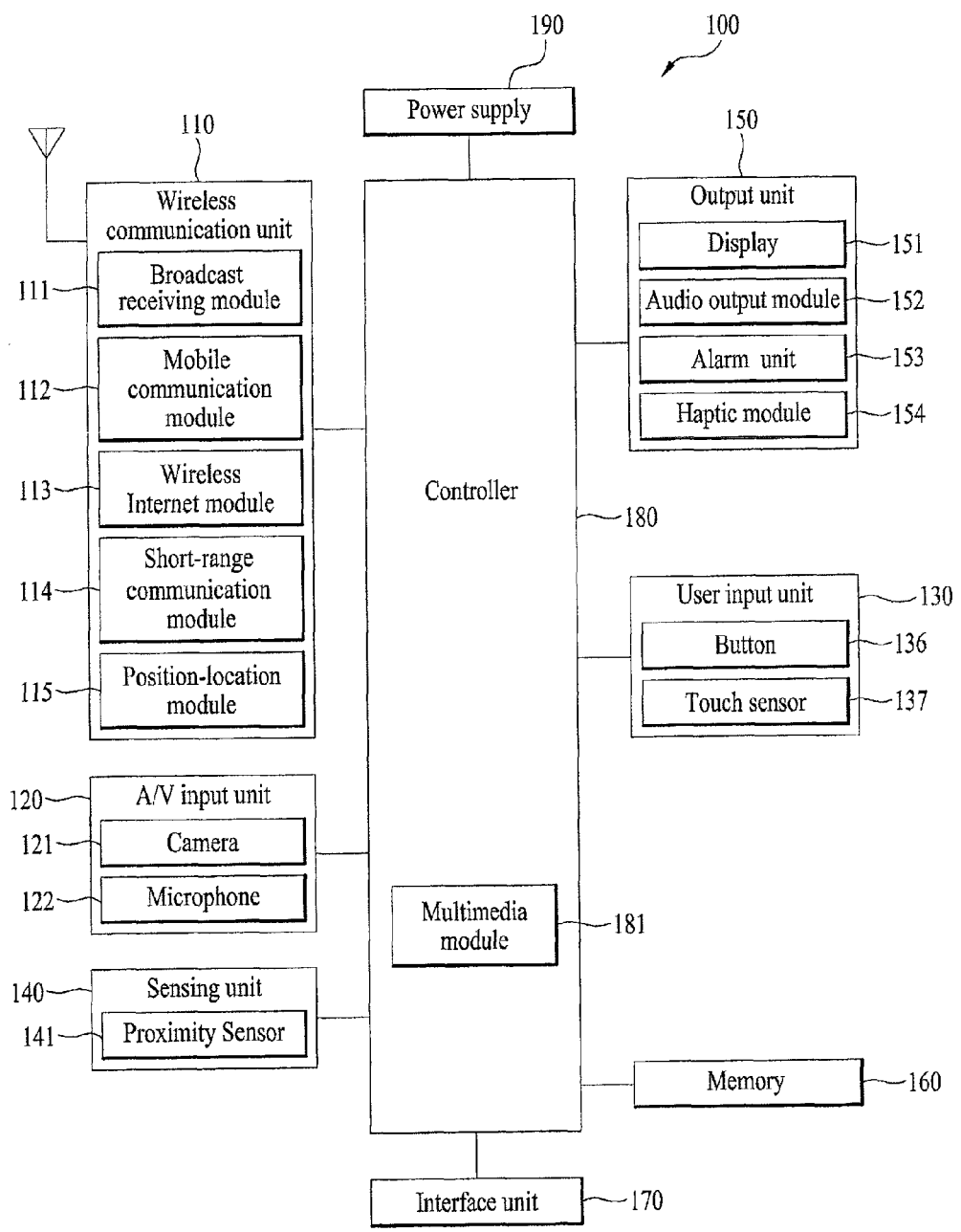
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch. In FIG. 1, the user input unit 130 includes a button 136 and a touch sensor 137.

The sensing unit 140 provides sensing signals for controlling operations of the mobile terminal 100 using status measurements of various aspects of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100. As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, the proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. And, a position, at which the proximity touch is made to the touchscreen using the pointer, may mean a position of the pointer vertically corresponding to the touchscreen when the pointer makes the proximity touch.

The proximity sensor 141 detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 can output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 can operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
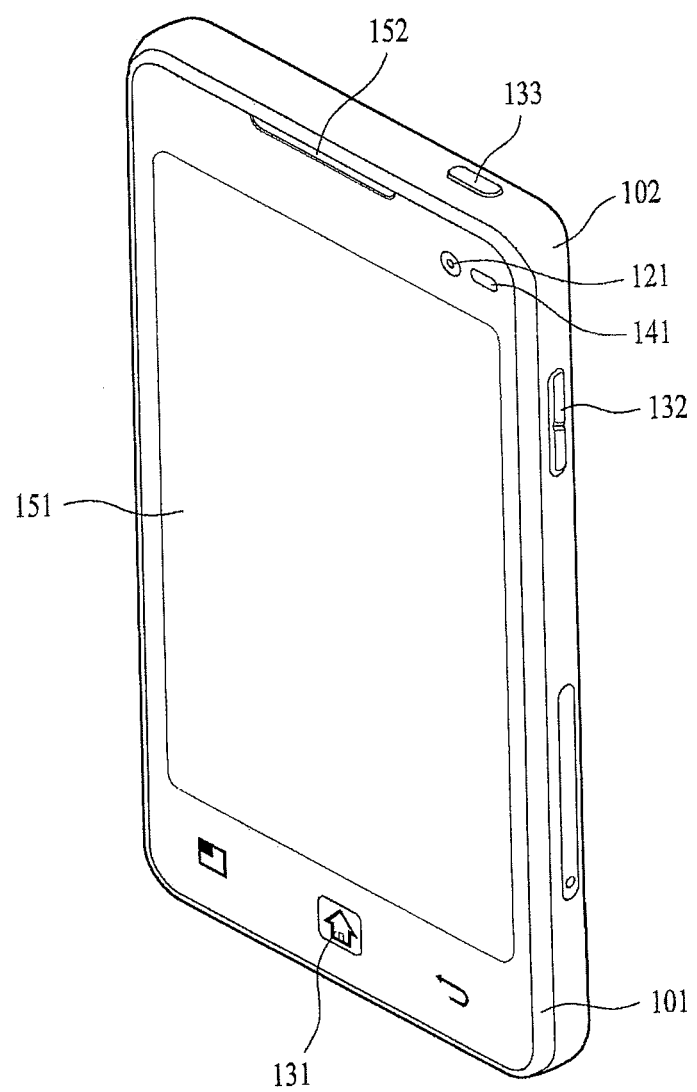
FIG. 2 is a front perspective diagram of a mobile terminal according to one embodiment of the present invention.

FIG. 2 is a front perspective view of a mobile terminal according to one embodiment of the present invention. The mobile terminal 100 illustrated in FIG. 2 has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, such disclosure may apply equally to other types of mobile terminals.

Referring to FIG. 2, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102.

Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130 (see FIG. 1).

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132.

Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

For clarity and convenience of the following description, a mobile terminal mentioned in the following description is assumed as including at least one of the components shown in FIG. 1.

Conjoint Processing of Voice Recognitions

Recently, mobile terminals include voice recognition functions. However, it is difficult for a general mobile terminal to modify a result from recognizing a voice once or perform another function using the recognized voice. Therefore, embodiments of the present invention provides a method of modifying a result of a previously recognized voice in a manner of combining the result of the previously recognized voice with a result of another voice recognition or performing a different function using the modified result and a mobile terminal for the same.

FIG. 3 is a flowchart illustrating one example of a method of processing voice recognition results conjointly according to one embodiment of the present invention. Referring to FIG. 3, the controller 180 of the mobile terminal 100 enters a voice recognition mode for recognizing a voice signal input via the microphone 122 as a control command (S310).

The controller 180 can enter the voice recognition mode in response to a prescribed command input (e.g., a selection of a shortcut icon of a voice recognition mode, etc.) via the user input unit 130 or the touchscreen 151 or an occurrence of a specific event for example. However, the present invention may be non-limited by the voice recognition mode entering method.

The voice recognition mode can be implemented into one application form. While the voice recognition mode is active, at least one partial function of at least another application.

Once the voice recognition mode is entered, the controller 180 activates the microphone 122, recognizes a voice input via the microphone 122 (S320), and then outputs a recognition result in a prescribed form (e.g., a text, an image, a combination of text and image, etc.) to the touchscreen 151 (S330).

If a user selects the recognition result output to the touchscreen 151 (Yes in S340), the controller 180 recognizes an additionally input voice (S350) and then combines the selected recognition result with the additionally recognized voice (S360).

In this instance, 'combine' may mean: 1) change a previously recognized result by adding an additionally recognized result to the previously recognized result; 2) output a new recognition result including both of a previously recognized result and an additionally recognized result; 3) perform a function corresponding to an additionally recognized result in addition to a previously recognized result; 4) perform an operation for a previously recognized result on an additionally recognized result, and the like, thereby meaning that a prescribed operation is performed using at least one portion of information of the previously recognized result and the additionally recognized result together.

In the following description, a method of modifying a previously recognized result with an additionally recognized result using voice recognition according to the present invention is explained in detail with reference to FIGS. 4A to 7. In particular, FIGS. 4A to 4C are diagrams illustrating one example of a method of adding a content to a memo, which is prepared through a voice recognition, by an additional voice recognition in a mobile terminal according to one embodiment of the present invention.

In the following drawings including FIG. 4A, assume a situation after entering a voice recognition mode in response to a prescribed command input. Also assume that a voice recognized from a user on a user interface in a voice recognition mode and a controller's response to the recognized voice are output in form of a word balloon (message) thread to the touchscreen 151.

Figure 4A:
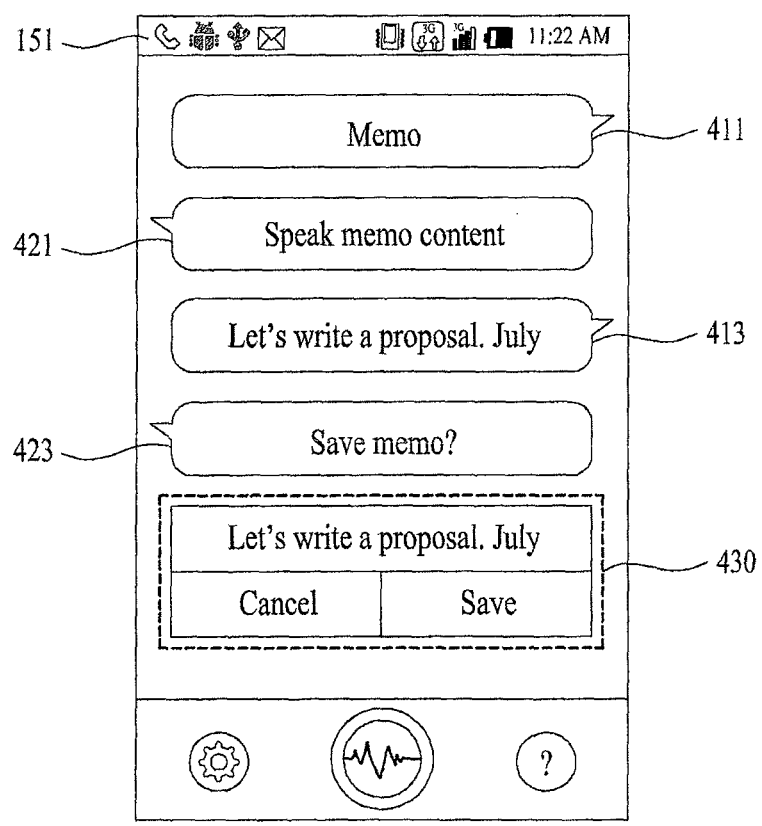
FIGS. 4A to 4C are diagrams illustrating one example of a method of adding a content to a memo, which is written through a voice recognition, by an additional voice recognition in a mobile terminal according to one embodiment of the present invention.
Figure 4B:
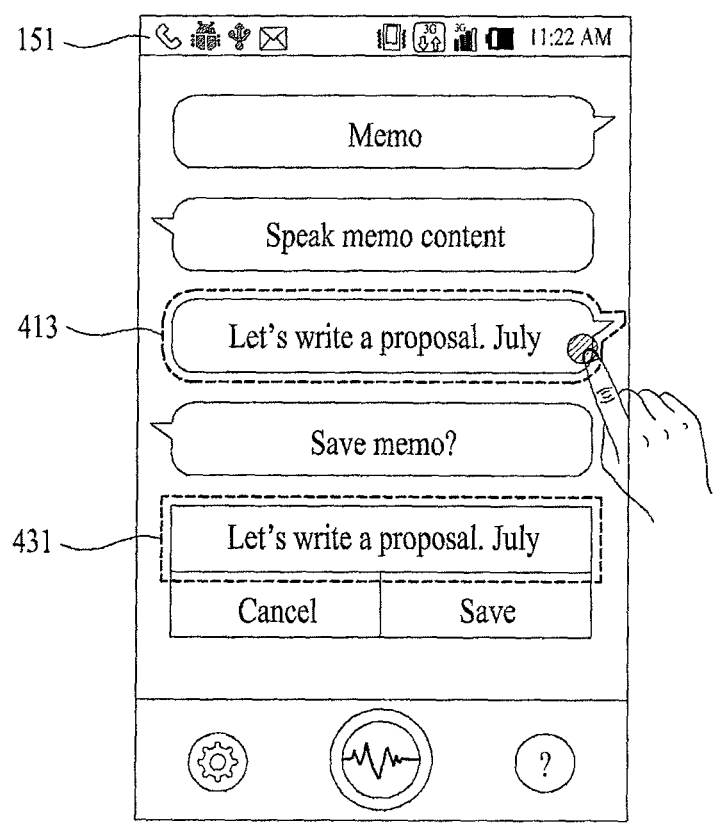
Figure 4C:
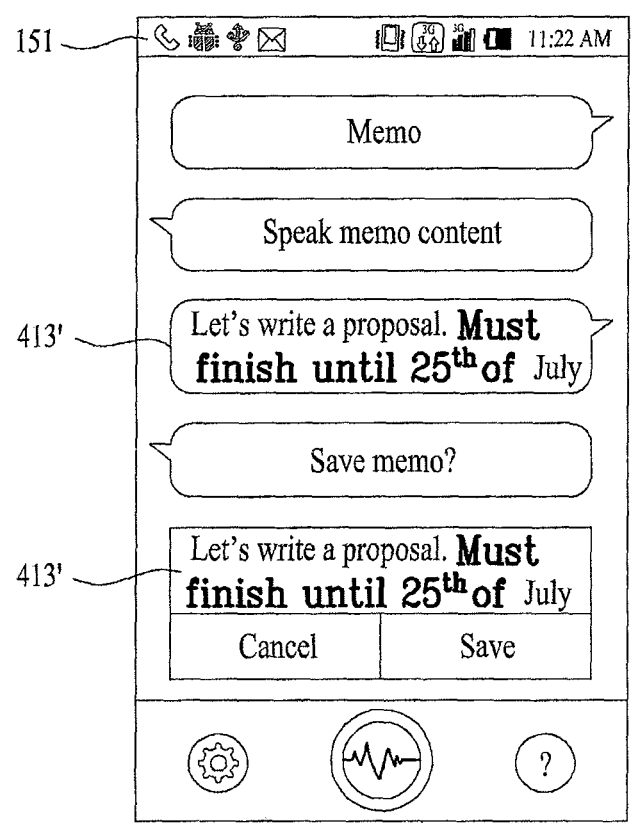

Referring to FIG. 4A, as a voice recognition mode is entered, a user interface for the voice recognition mode is displayed on the touchscreen 151. A user inputs a voice or speech 'memo' via the microphone 122 and the controller 180 then outputs a result of the corresponding recognition as a text 411 to the touchscreen 151. Moreover, the controller 180 determines that the user will use a memo writing function by recognizing the recognition result as a user command and outputs a text 421 to instruct the user to input a memo content.

The user inputs such a voice as the memo content 'Let's write a proposal. July' through the microphone 122. The input voice is converted to a text 413 by the controller 180 and then displayed on the touchscreen 151. The controller 180 then displays a text 423, which queries whether to save the corresponding recognition result, on the touchscreen 151. Together with the text 423, a memo application module 430 may be displayed on a bottom end of the touchscreen 151. On the memo application module 430, a menu for determining whether to save can be displayed together with the memo content, i.e., the text 413 corresponding to the voice recognized result. In doing so, it can save the recognized memo content if a save menu displayed on the memo application module 430 is selected by a touch input or a voice 'save' is input. Thus, the saved memo can be confirmed or modified by paging a memo application in the future.

In this instance, if the user intends to modify the recognized memo content by voice recognition, referring to FIG. 4B, the user can select the text 413 corresponding to the previously input memo. Hence, prescribed visual effect(s) can be displayed on the text 413 corresponding to the previously input memo and/or the memo text 431 displayed on the memo application module 430 to indicate that the corresponding text is selected. In doing so, if a simple touch, a proximity touch or a long touch for prescribed duration is maintained onto a modification desired recognition result displayed on the touchscreen 151 or while the corresponding touch state is maintained, the controller 180 can determine that the corresponding recognition result is selected. In addition, the prescribed visual effect indicating the a presence of the selection may include at least one of a color change of a word balloon, an outline emphasized effect, a blinking in different color, a presence of an indicator and the like, which will be described in detail with reference to FIG. 5.

Referring to FIG. 4C, while the modification desired recognition result 413 is selected, if the user additionally inputs a voice (e.g., Must finish until $25^{th}$ of), the controller 180 can modify the modification desired recognition result into a text 413' using information corresponding to the additionally recognized voice. Thus, the text 431 displayed on the memo application module 430 can be modified into the text 413' as well.

Meanwhile, the selection of the modification desired recognition result can be performed in various ways. Further, the controller 180 can inform the user that the modification desired recognition result is selected in various ways. This operation is described with reference to FIG. 5 as follows.

Figure 5:
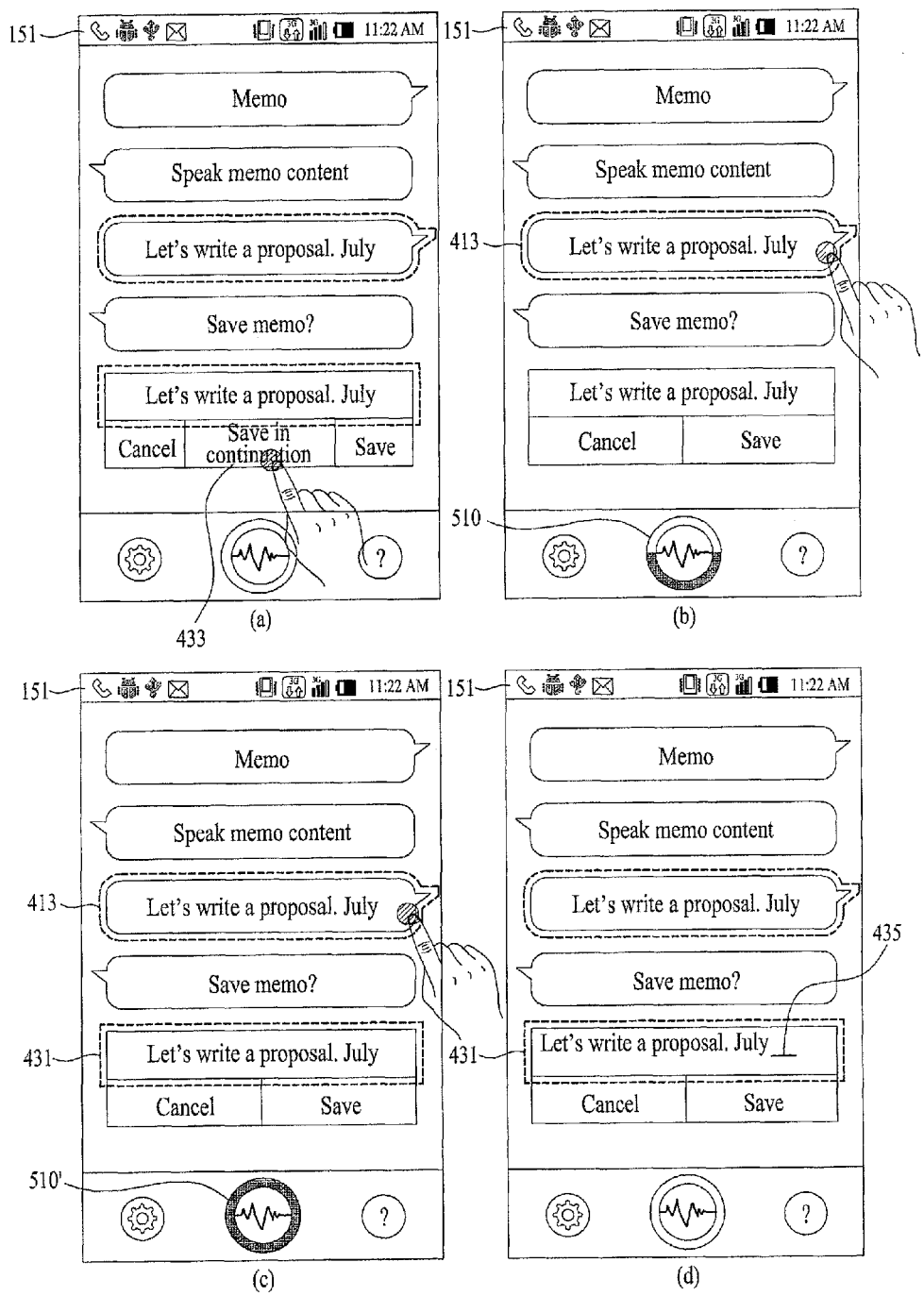
FIG. 5 is a diagram illustrating a different method of selecting a modification desired recognition result and another example of a visual effect indicating that the modification desired recognition result is selected in a mobile terminal according to one embodiment of the present invention.

In particular, FIG. 5 is a diagram for a different method of selecting a modification desired recognition result and another example of a visual effect indicating that the modification desired recognition result is selected in a mobile terminal according to one embodiment of the present invention.

Referring to FIG. 5(a), a menu 'Save in continuation' 433 can be additionally displayed on the memo application module. If the corresponding menu 433 is selected, the controller 180 can add a recognition result corresponding to a next-input user voice to a previously recognized memo.

Referring to FIG. 5(b), in order to help an accurate selection of a modification desired recognition result (to prevent malfunctions) and inform a user that an additional voice recognition is available, the controller 180 can control a color of an outline of a voice recognition icon 510, which is provided to a bottom end of a user interface, to gradually change in proportion to a period of time for maintaining a touch input to the modification desired recognition result. If the touch input is maintained over prescribed duration, referring to FIG. 5(c), the color of the outline of the voice recognition icon 510 can fully change. If so, the controller 180 additionally recognizes a user voice, which is input after the color has fully changed, and then enables the selected word balloon 413 (i.e., the modification desired recognition result) and/or the memo text 431 of the memo application module to reflect the additionally recognized user voice.

Moreover, referring to FIG. 5(*d*), as the modification desired recognition result is selected, the controller 180 may control a cursor 435 to be displayed on a region, on which the memo text 431 is displayed, of the memo application module or may control a blank box or row to be additionally displayed on the corresponding region.

In the following description, how to process a previously recognized result displayed on a touchscreen in response to an activation of an additional voice recognition is explained in detail with reference to FIG. 6. In particular, FIG. 6 is a diagram illustrating one example of a type of displaying a previously recognized result attributed to performing an additional voice recognition in a mobile terminal according to one embodiment of the present invention.

Figure 6:
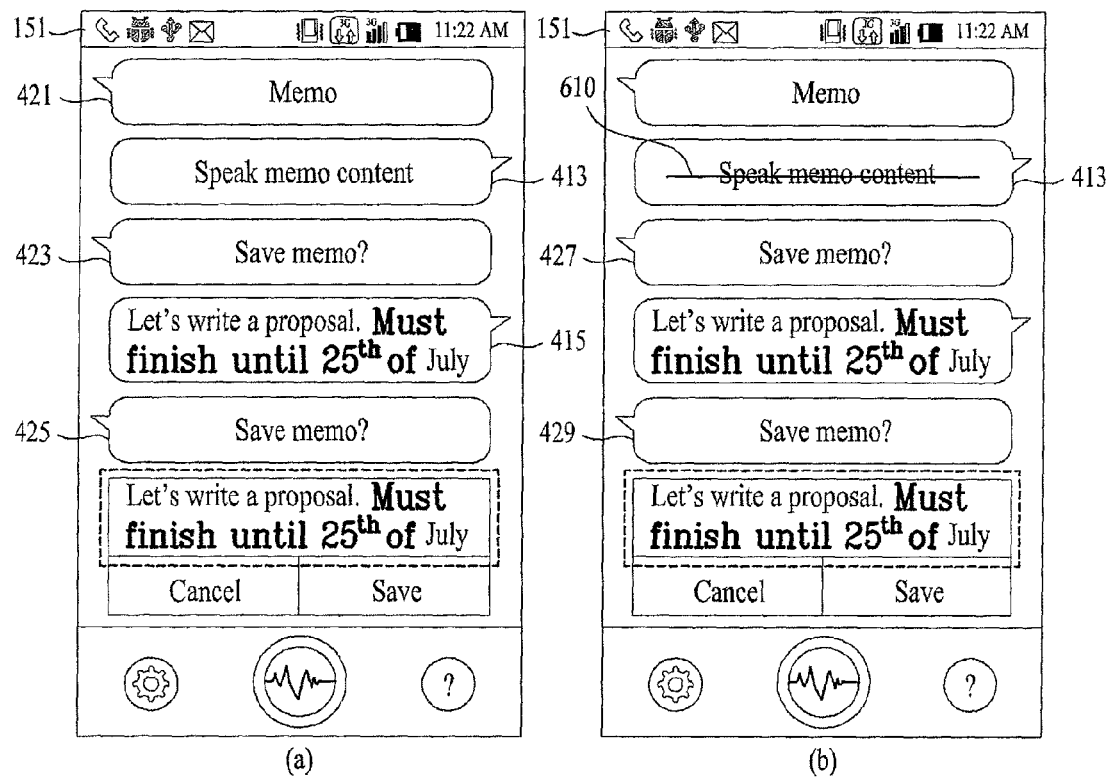
FIG. 6 is a diagram illustrating one example of a type of displaying a previously recognized result attributed to performing an additional voice recognition in a mobile terminal according to one embodiment of the present invention.

In FIG. 6, assume that a user voice 'Must finish until 25$^{th}$' is additionally recognized after the text 413 corresponding to the previously input memo has been selected in the situation shown in FIG. 4B. In FIG. 4C, the result of the additionally recognized voice combination is exactly displayed as the text 413' within the selected word balloon 413. Yet, referring to FIG. 6(*a*), a word balloon 415 according to the additional combination result may be displayed while the selected previous word balloon 413 is left intact. And, a response text 425 of the controller 180 can be additionally displayed in response.

Moreover, referring to FIG. 6(*b*), a horizontal line 610 may be additionally displayed to indicate that the selected previous word balloon 413 has been modified. The recognition result selecting method, the visual effects indicating the selection, and the method of processing the previously recognized result in response to the additional voice recognition, which are described with reference to FIG. 5 and FIG. 6, can be selectively applied to the following embodiments described with reference to other accompanying drawings.

In the following description, a method of modifying a configured schedule or adding a content thereto by voice recognition is explained with reference to FIG. 7. In particular, FIG. 7 is diagram illustrating one example of a method of adding a content to a voice-recognition prepared schedule or modifying the schedule by an additional voice recognition in a mobile terminal according to one embodiment of the present invention.

Figure 7:
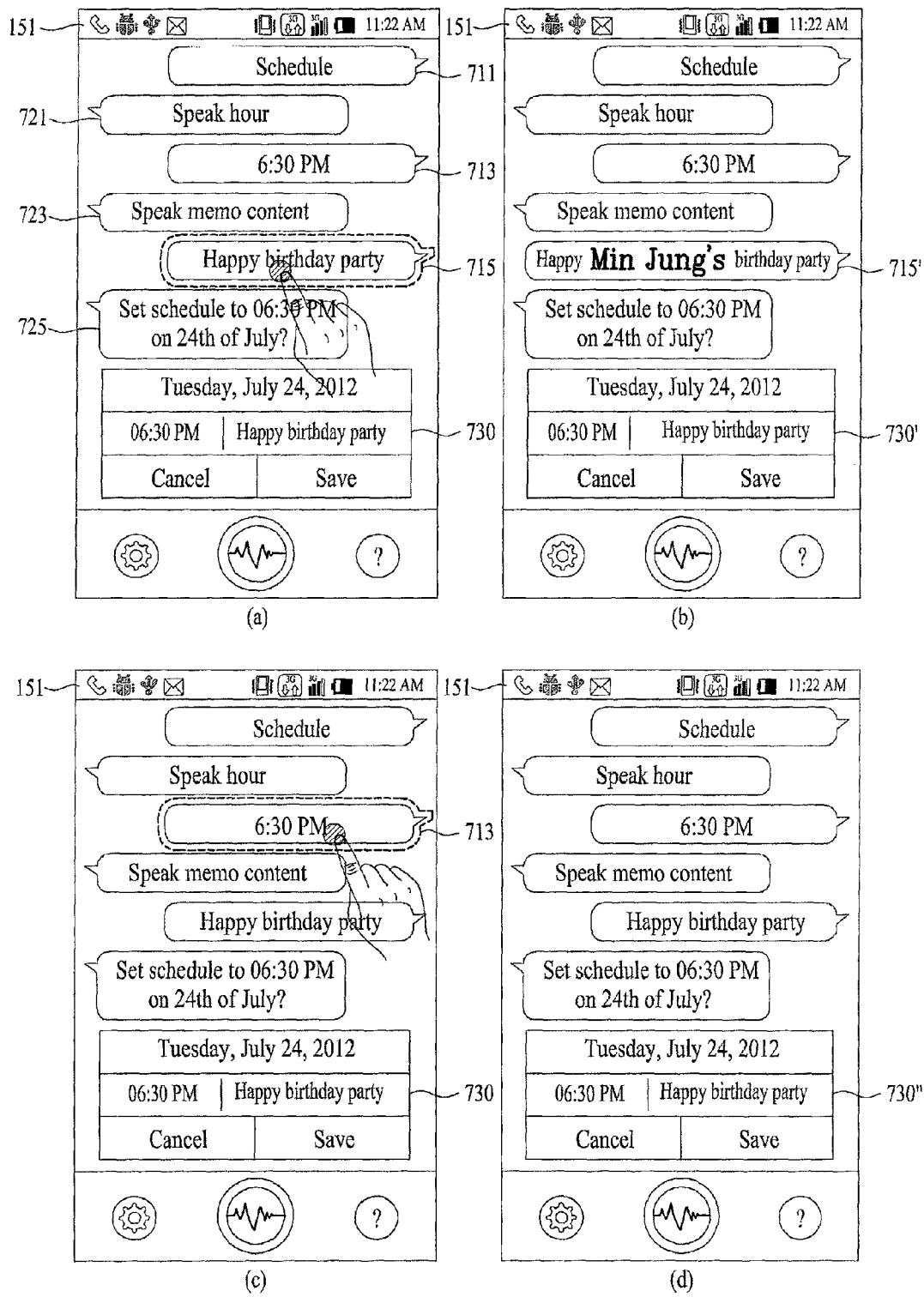
FIG. 7 is diagram illustrating one example of a method of adding a content to a voice-recognition prepared schedule or modifying the schedule by an additional voice recognition in a mobile terminal according to one embodiment of the present invention.

Referring to FIG. 7(*a*), as a voice recognition mode is entered, a user interface for the voice recognition mode is displayed on the touchscreen 151. A user inputs a voice or speech 'schedule' via the microphone 122 and the controller 180 then outputs a corresponding recognition result as a text 711 to the touchscreen 151. Moreover, the controller 180 determines that the user will use a schedule add function by recognizing the recognition result as a user command and outputs a text 721 to instruct the user to input a schedule hour.

If the user inputs a voice corresponding to the hour, a recognized hour 713 is displayed. In addition, the controller 180 outputs a text 723 to request a schedule content input. Hence, the user inputs a voice 'Happy birthday party' via the microphone 122. The input voice is converted to a text 715 by the controller 180 and is then displayed on the touchscreen 151. The controller 180 combines or integrates the recognition results of the voices input through two changes and then displays a text 725, which queries whether to configure a prescribed schedule, on the touchscreen 151.

Together with the text 725, a schedule application module 730 may be displayed on a bottom end of the touchscreen 151. On the schedule application module 730, a menu for determining whether to save can be displayed together with schedule information corresponding to the result of the voice recognition of the schedule content. In doing so, it can save the recognized schedule content if a save menu displayed on the schedule application module 730 is selected by a touch input or a voice 'save' is input. Thus, the saved schedule can be confirmed or modified by paging a schedule application in the future.

In this instance, if the user intends to add information to a specific part of the recognized schedule content by voice recognition, the user can apply a touch input to an insertion desired point in the text 715 on which the previously recognized schedule content is displayed.

Subsequently, if a voice 'Min Jung's' is additionally input, referring to FIG. 7(*b*), a content corresponding to the additionally input voice can be added to the selected point, i.e., between 'Happy' and 'birthday party', which is denoted by a reference number 715'. Thus, the schedule information displayed on the schedule application module 730' can be modified as well. If a blank part is selected instead of the specific part of the text within the word balloon shown in FIG. 7(*a*), a content corresponding to an additionally input voice can be added as shown in FIG. 4. Similarly, if the user intends to modify the previously recognized hour, the user selects the text 713 (FIG. 7(*c*)) and is then able to modify the hour, as shown in FIG. 7(*d*), by inputting a vice of a desired hour to modify.

Conjoint Search

In the foregoing description so far, the present invention is described centering on the method of creating such a new information as a memo, a schedule and the like and then modifying the created information. On the other hand, according to another embodiment of the present invention, when a search function by voice recognition is used, a new search keyword is combined with a previous search result and then compared.

Figure 8:
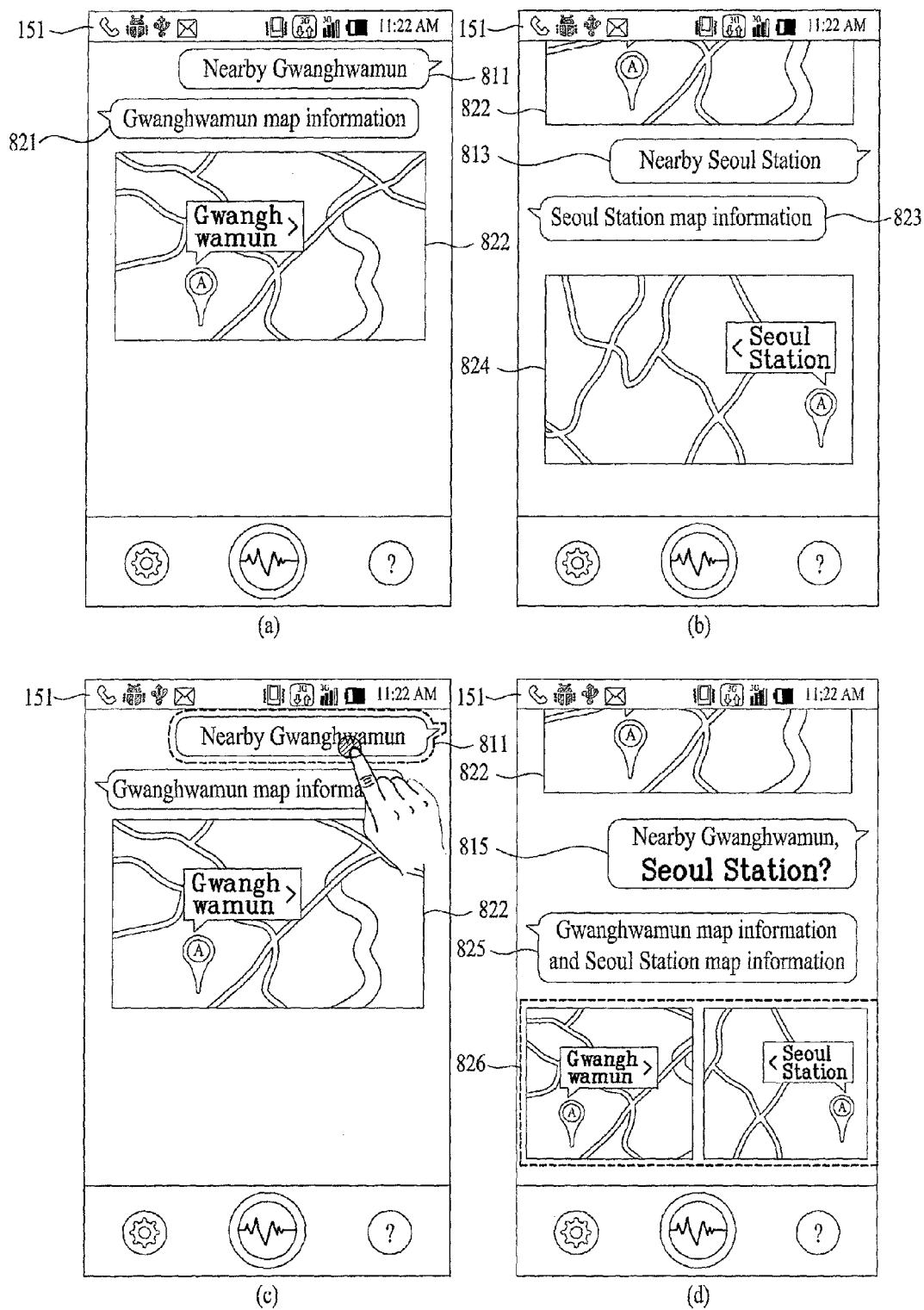
FIG. 8 is a diagram illustrating one example of a method of adding a search word through an additional voice recognition after performing a search through a voice recognition in a mobile terminal according to another embodiment of the present invention.

FIG. 8 is a diagram illustrating one example of a method of adding a search word through an additional voice recognition after performing a search through a voice recognition in a mobile terminal according to another embodiment of the present invention. Referring to FIG. 8, a prescribed situation is assumed as follows. First of all, as a voice recognition mode is entered, a user interface for the voice recognition mode is displayed on the touchscreen 151. Subsequently, 'internet search' is input through voice recognition. In response to the input, a text 'Input a search word' is displayed.

Referring to FIG. 8(*a*), as a search word 'Nearby Gwanghwamun' is input, a recognized text 811 is displayed. The controller 180 performs an internet search using the corresponding text and then displays such a search result as a response text 821 and a map information 822 corresponding to a place around Gwanghwamun. Thus, referring to FIG. 8(*b*), if a user inputs another search word 'Nearby Seoul Station', a recognized text 813, a response text 823 and a map information 824 corresponding to a place around Seoul Station can be displayed in order.

In the situation shown in FIG. 8(*a*), if the user selects the text 811 corresponding to the previously recognized search word through a touch input and then additionally inputs a voice 'Seoul Station?' (FIG. 8(*c*)), a search word corresponding to the additionally input voice is displayed together with the previously recognized search word (FIG. 8(*d*)). In this instance, both of the displayed search words are denoted by a reference number 815.

Hence, the controller 180 performs a search with the search words and then displays such a search result as a text 825 and a map information 826. Thus, the map information corresponding to the displayed search result may have a configuration simpler than that of a map information attributed to a single search word (FIG. 8(*d*)). Alternatively, the map information corresponding to the displayed search result may be displayed in a manner that the map information 822 of the single search and the map information 824 of the single search are displayed in sequence.

For a simple configuration, if one of the search results is selected, the selected search result can be displayed in further detail. Moreover, when a search target is local weather, temperatures, cloudy conditions and the like can be comparatively displayed together instead of map information. When a search target is a navigation route, distances to a destination, estimated times of arrival at the destination and the like can be comparatively displayed together.

Conjoint Function Executions

According to a further embodiment of the present invention, proposed is a method of performing a function corresponding to an additionally recognized voice using information on a previously recognized voice.

Figure 9:
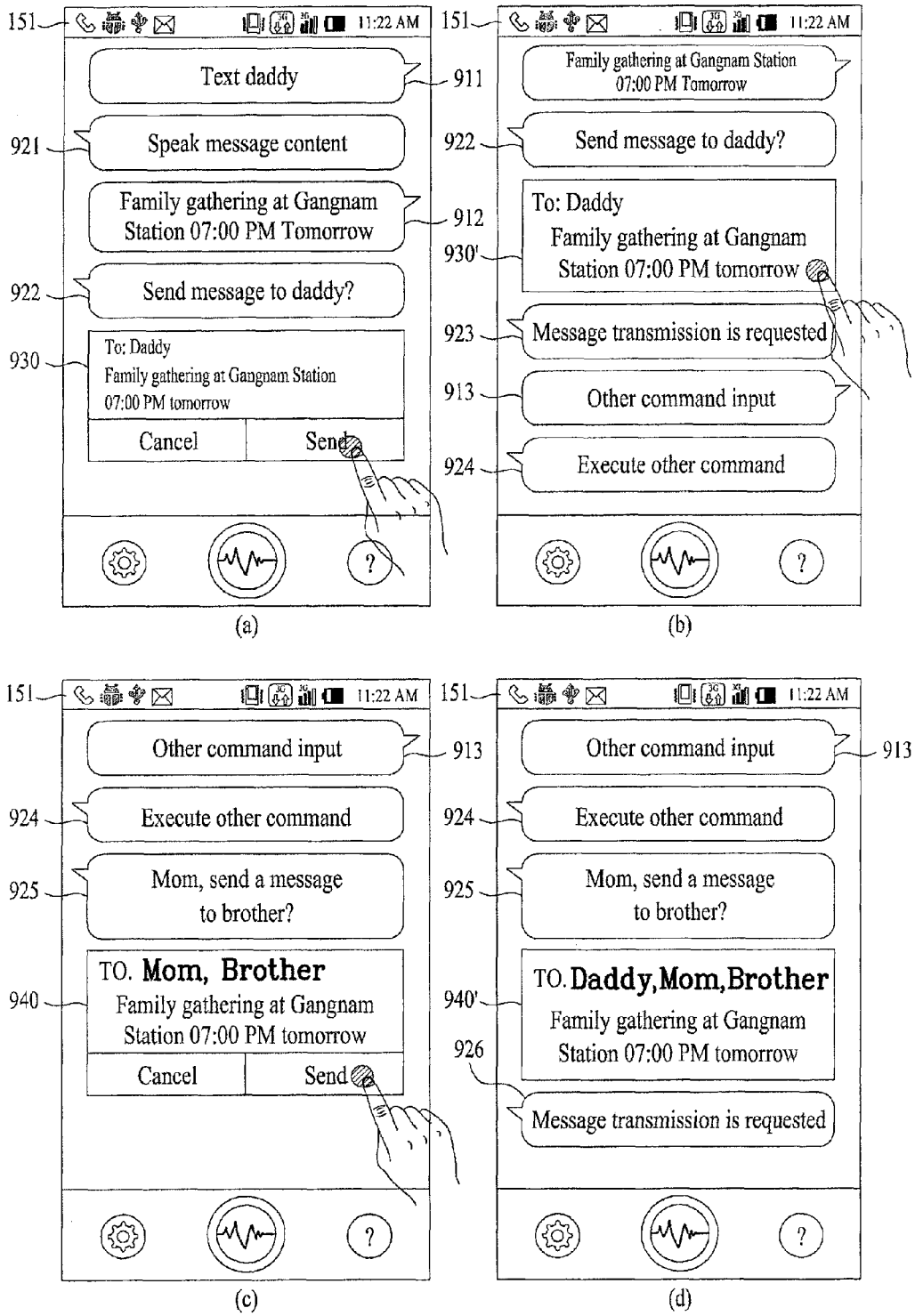
FIG. 9 is a diagram illustrating one example of a method of performing a side function on an information, which was previously input through a voice recognition, using an additionally recognized voice in a mobile terminal according to another embodiment of the present invention.

FIG. 9 is a diagram illustrating one example of a method of performing a side function on information, which was previously input through a voice recognition, using an additionally recognized voice in a mobile terminal according to another embodiment of the present invention.

Referring to FIG. 9(*a*), as a voice recognition mode is entered, a user interface for the voice recognition mode is displayed on the touchscreen 151. A user inputs a voice 'Text daddy' via the microphone 122. The controller 180 then outputs a corresponding recognition result as a text 911 to the touchscreen 151. Moreover, the controller 180 recognizes the recognition result as a user command and then determines that the user will send 'text message' to a recipient 'daddy'. Subsequently, the controller 180 uses a text 921 to instruct the user to input a message content to send.

If the user inputs a voice corresponding to the message content to send, a recognized content 912 is displayed. The controller 180 outputs a text 922 querying whether the user will send the content. Together with the text 922, a text message application module 930 containing the recognized content can be displayed. In this instance, if the user selects a send menu displayed on the text message application module 930, the corresponding content can be sent.

If the text message transmission is completed, referring to FIG. 9(*b*), a send/cancel menu may disappear from the corresponding module 930' and a text 923, which indicates that a message has been sent, can be displayed. Subsequently, in order to activate a side function, the user can input a voice 'other command input'. In response to the input voice, a corresponding recognition text 913 and a response text 924 can be respectively displayed. Thereafter, the user selects the transmission completed text message application module 930 and is then able to input a voice 'forward to mom and brother'.

Hence, referring to FIG. 9(*c*), the controller 180 can display a text 925 which asks the user whether to forward a message containing the same content of the previously sent message to mother and brother. Moreover, the controller 180 can display a text message application module 940, to which the same content of the previously sent message is input, with recipients set to mom and brother. In this instance, if the user selects a send menu displayed on the text message application module 940 or inputs a voice 'send', the text message transmission can be performed in a manner represented in the text message application module 940.

As a result, referring to FIG. 9(*d*), the controller 180 determines that a recipient of the text message containing the same content is added and then displays a text message application module 940' having recipients modified and a text 926 indicating that the transmission is completed. When the recipient is modified as shown in FIG. 9(*d*), the previous text message application module 930' may disappear from the user interface or a horizontal line may be displayed thereon as shown in FIG. 6(*b*). Unlike FIG. 9(*d*), if the recipient is not modified, the previous text message application module 930' can be maintained as it is.

In addition, when 'send' is not selected in the situation shown in FIG. 9(*a*), while 'input other command' for activating a side function is not input, if the recognized message content 912 is selected, it can add an information corresponding to an additionally recognized voice to the corresponding content, as shown in FIG. 4. Moreover, a position for inserting the information corresponding to the additionally recognized voice may be changed in response to a touched part in the recognized message content 912.

In the following description, a case of a voice call in accordance with voice recognition is explained in detail with reference to FIG. 10. In particular, FIG. 10 is a diagram illustrating another example of a method of performing a side function on an information, which was previously input through a voice recognition, using an additionally recognized voice in a mobile terminal according to another embodiment of the present invention.

Figure 10:
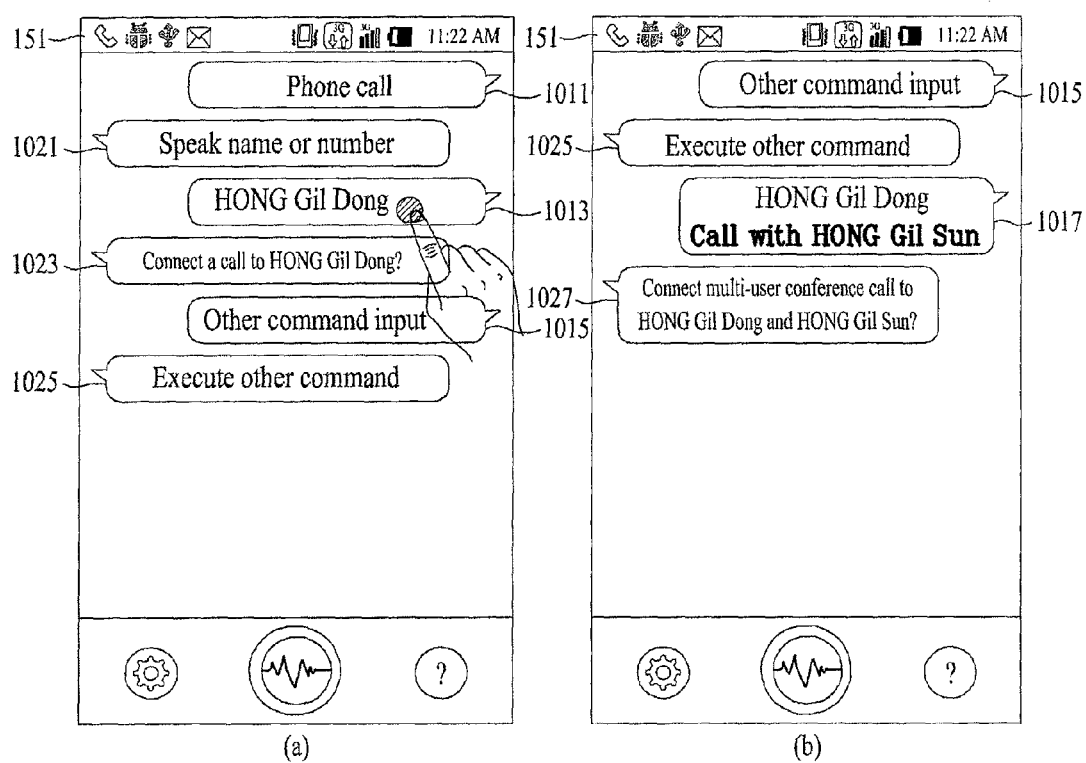
FIG. 10 is a diagram illustrating another example of a method of performing a side function on an information, which was previously input through a voice recognition, using an additionally recognized voice in a mobile terminal according to another embodiment of the present invention.

Referring to FIG. 10(*a*), as a voice recognition mode is entered, a user interface for the voice recognition mode is displayed on the touchscreen 151. A user inputs a voice 'Phone call' via the microphone 122. The controller 180 then outputs a corresponding recognition result as a text 1011 to the touchscreen 151. Moreover, the controller 180 recognizes the recognition result as a user command and then determines that the user will make a voice call.

Subsequently, the controller 180 uses a text 1021 to instruct the user to input a callee. If the user inputs a voice corresponding to a name of the callee, a recognized content 1013 is displayed. The controller 180 searches a phonebook to obtain contact information corresponding to the input voice and then outputs a text 1023 querying whether the user will connect a voice call to a corresponding contact.

Thus, if the user intends to modify/change the currently recognized name 'HONG Gil Dong', the user selects the recognized callee 1013 and then additionally inputs a voice. On the other hand, when the user intends to change a current function into a multi-user conference call by adding callee(s), the user can input a voice 'other command input'. In response to the input voice, a corresponding recognition text 1015 and a response text 1025 can be respectively displayed on the touchscreen 151.

Subsequently, if the user additionally inputs a voice 'Call with HONG Gil Sun', referring to FIG. 10(*b*), the recognized voice can be displayed as a text 1017 together with the previously recognized counterpart. In doing so, the controller 180 recognizes that a plurality of call counterparts are selected owing to the added call counterpart, determines that the user requests the multi-user conference call function, and is then able to output a text 1027 querying whether to activate the multi-user conference call function.

Estimated Information Display

When information on a previously recognized voice is selected, a mobile terminal according to the present invention estimates a command a user will input additionally and is then able to display the estimated command. This operation is described in detail with reference to FIG. 11 as follows.

Figure 11:
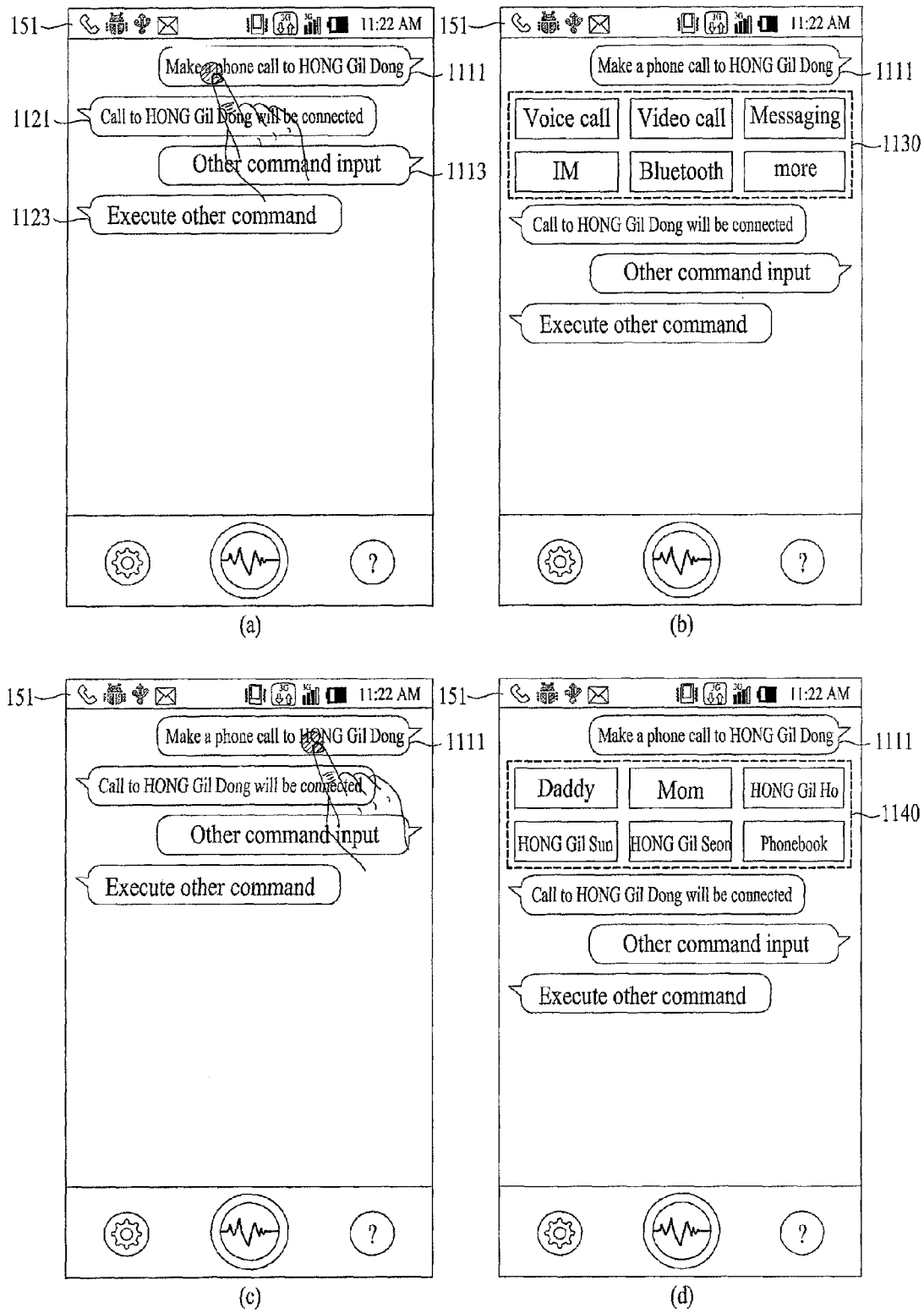
FIG. 11 is a diagram illustrating one example of a method of displaying information estimated in response to a selection of information corresponding to a previously recognized voice, applicable to embodiments of the present invention.

FIG. 11 is a diagram illustrating one example of a method of displaying information estimated in response to a selection of information corresponding to a previously recognized voice, applicable to embodiments of the present invention. Referring to FIG. 11(a), as a voice recognition mode is entered, a user interface for the voice recognition mode is displayed on the touchscreen 151.

A user inputs a voice 'Make a phone call to HONG Gil Dong' via the microphone 122. The controller 180 then outputs a corresponding recognition result as a text 1111 to the touchscreen 151. Moreover, the controller 180 recognizes the recognition result as a user command and then determines that the user will make a voice call. Subsequently, the controller 180 searches a phonebook to obtain contact information corresponding to HONG Gil Dong and then outputs a text 1121 querying whether the user will connect a voice call to a corresponding contact.

Irrespective of whether the call is connected, if the user inputs a voice 'other command input', a corresponding recognition text 1113 and a response text 1123 can be respectively displayed on the touchscreen 151. In doing so, if a 'HONG Gil Dong (i.e., callee)' part is selected from the initially recognized text 1111, referring to FIG. 11(b), the controller determines functions that can be executed for the callee 'HONG Gil Dong' and is then able to display a corresponding result 1130 on the touchscreen 151. Thus, a frequency of use, a recently activated order and the like can be taken into consideration in determining a sort order of the determined result 1130.

Meanwhile, if a part 'phone call', which is an executable function, is selected from the initially recognized text 1111 (FIG. 11(c)), the controller 180 determines other callees to them 'phone call' can be made and is then able to display a corresponding result 1140 on the touchscreen 151 (FIG. 11(d)).

Additional Voice Input Depending on the Number of Pointers

According to a further embodiment of the present invention, proposed is a method of performing a different operation depending on the number of pointers (i.e., touched points) for simultaneous touches in selecting information on a previously recognized voice.

Figure 12:
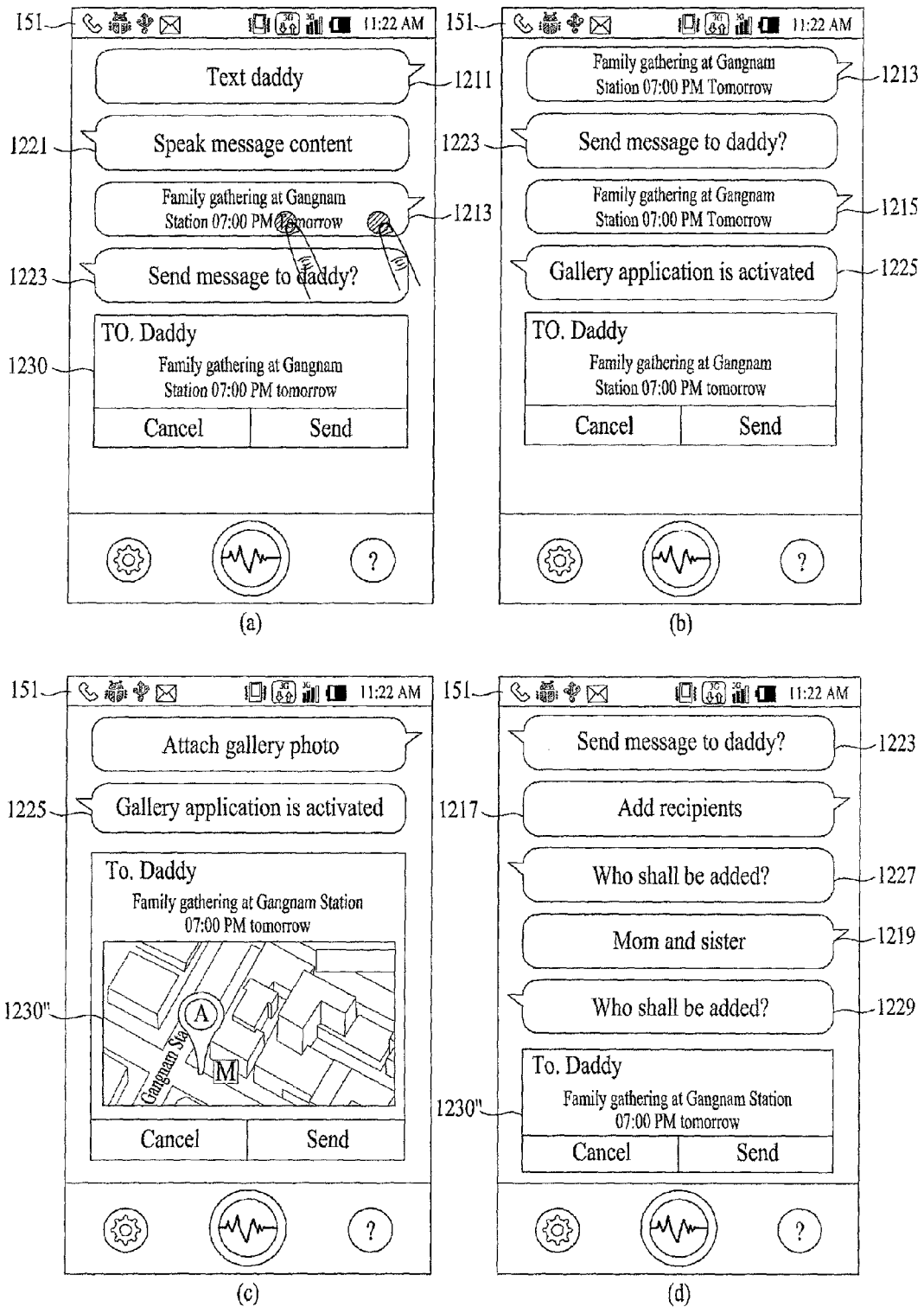
FIG. 12 is a diagram illustrating one example of a type of performing a different operation depending on the number of pointers for selecting a previously recognized result in a mobile terminal according to a further embodiment of the present invention.

FIG. 12 is a diagram illustrating one example of a type of performing a different operation depending on the number of pointers for selecting a previously recognized result in a mobile terminal according to a further embodiment of the present invention. Referring to FIG. 12(a), as a voice recognition mode is entered, a user interface for the voice recognition mode is displayed on the touchscreen 151.

A user inputs a voice 'Text daddy' via the microphone 122. The controller 180 then outputs a corresponding recognition result as a text 1211 to the touchscreen 151. Moreover, the controller 180 recognizes the recognition result as a user command and then determines that the user will send 'text message' to a recipient 'daddy'. Subsequently, the controller 180 uses a text 1221 to instruct the user to input a message content to send. If the user inputs a voice corresponding to the message content to send, a recognized content 1213 is displayed.

The controller 180 outputs a text 1223 querying whether the user will send the content. Together with the text 1223, a text message application module 1230 containing the recognized content can be displayed. In this instance, if the user selects the text 1213 representing the recognized content of the text message with a single finger (i.e., to create a single touch point), an additionally input voice can be added to the corresponding text.

On the other hand, if the text 1213 representing the recognized content of the text message is selected with two fingers (i.e., to create two touch points), as shown in FIG. 12(a), an additionally input voice can be recognized as a command for performing a side function.

For instance, referring to FIG. 12(b), when the additionally input voice is 'Attach gallery photo' 1215, the controller 180 determines that the user intends to attach an image to the corresponding message, outputs a text 1225 indicating that a gallery application is about to be activated, and can then activate the gallery application. If an image to be attached to the gallery application is selected, referring to FIG. 12(c), the selected image is attached and then displayed on the text message application module 1230'.

In another instance, referring to FIG. 12(d), when the additionally input voice is 'Add recipients' 1217, the controller 180 determines that the user intends to add recipients of the corresponding message and then outputs a text 1227 instructing the user to input additional recipients. Hence, if the user inputs the additional recipients 1219 with a voice, the controller 180 outputs a response text 1229 and the added recipients can be displayed on the text message application module 1230."

Meanwhile, unlike FIG. 12, a specific function can be directly activated depending on the number of simultaneously touched points without an additional voice recognition. For instance, if a text corresponding to a recognized text message content is selected with two fingers, a gallery application for image attachment can be active.

If the text corresponding to the recognized text message content is selected with three fingers, the text 1227 instructing the user to input additional recipients can be instantly displayed. In this instance, it is preferable that the number of points simultaneously to a single recognition result and a function matching the number are determined in advance. Further, the corresponding matching relation can be changed by a user.

In the above-described embodiments of the present invention, when a text for a response to a recognition result of a user voice or a text for a user voice input request is output in a voice recognition mode, the controller can control a voice corresponding to the text to be output via the audio output unit 152. Alternatively, an audio can be output only without outputting (or displaying) the corresponding text.

Accordingly, the present invention provides the following advantages. First of all, more various and convenient functions can be provided through voice recognition.

Secondly, the present invention selects information corresponding to a previously recognized voice and modifies the corresponding information by activating a voice recognition function again or can perform various side functions using the modified information.

It will be apparent to those skilled in the art that various modifications and variations can be specified into other form(s) without departing from the spirit or scope of the inventions.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include transmission via Internet, etc.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
    a wireless communication unit configured to wirelessly communicate with at least one other terminal;
    a microphone configured to receive a first voice input;
    a touchscreen; and
    a controller configured to:
        display a first text converted from the first voice input on the touchscreen,
        receive a touch input to select the displayed first text,
        receive a second voice input via the microphone,
        combine the first text and a second text converted from the second voice input, such that the second text is inserted into the first text based on a location of the touch input applied to a text display region of the first text, and
        display the combined text on the touchscreen.

2. The mobile terminal of claim 1, wherein the controller is further configured to:
    display an application window on the touchscreen in response to reception of the selection of the displayed first text, and
    display information in the application window to indicate that the first text was combined with the second text.

3. The mobile terminal of claim 2, wherein the controller is further configured to display the application window in a user interface for voice recognition.

4. The mobile terminal of claim 2, wherein the controller is further configured to save the combined text, and
    wherein the saved text can be viewed by executing an application corresponding to the application window.

5. The mobile terminal of claim 4, wherein the application window is to set a memo or a schedule corresponding to the combined text, and the executed application is a memo application or a schedule application.

6. The mobile terminal of claim 1, wherein the controller is further configured to:
    display a third text converted from a third voice input and a fourth text converted from a fourth voice input, and
    display a first map corresponding to the third text and a second map corresponding to the fourth text together on the touchscreen.

7. The mobile terminal of claim 6, wherein the controller is further configured to display the first map and the second map together in a user interface for voice recognition.

8. The mobile terminal of claim 1, wherein the controller is further configured to:
    display a third text converted from a third voice input,
    send a first message including the third text to a first counterpart,
    display a message application window indicating that the first message was sent to the first counterpart,
    send the first message including the third text to a second counterpart, and
    display information in the message application window to indicate that the first message was sent to both the first counterpart and the second counterpart.

9. The mobile terminal of claim 8, wherein the controller is further configured to display the message application window together in a user interface for voice recognition.

10. The mobile terminal of claim 1, wherein the controller is further configured to:
    display a third text converted from a third voice input and a fourth text converted from a fourth voice input, and
    execute a conference call with a first counterpart corresponding to the third text and a second counterpart corresponding to the fourth text.

11. The mobile terminal of claim 1, wherein the controller is further configured to:
    display a third text converted from a third voice input, and
    in response to selection of the displayed third text, display a list of types of communication for the third text.

12. The mobile terminal of claim 1, wherein the controller is further configured to activate a gallery application in response to reception of a third voice input, and
    wherein the gallery application is activated for a function executed by a voice input prior to the third voice input.

13. The mobile terminal of claim 12, wherein the voice input prior to the third voice input is to send a message to a first counterpart, and
    wherein an image selected from the gallery application is displayed in a message application window for sending the message to the first counterpart, the message application window being displayed in a user interface for voice recognition.

14. The mobile terminal of claim 1, wherein the controller is further configured to determine an insert-desired portion of the first text based on the location of the touch input applied to the text display region of the first text.

15. The mobile terminal of claim 1, wherein the first text is selected by a touch input applied to the text display region of the first text.

16. The mobile terminal of claim 1, wherein the controller is further configured to output a visual effect to indicate that the first text was selected.

17. The mobile terminal of claim 16, wherein the visual effect is one of a color change, an emphasized outline, a blinking, and a presence indicator.

18. A mobile terminal comprising:
    a wireless communication unit configured to wirelessly communicate with at least one other terminal;
    a microphone;
    a touchscreen; and
    a controller configured to:
        receive a first voice input via the microphone,
        display a first text converted from the first voice input on the touchscreen,
        display a first reply to the first voice input on the touchscreen,
        receive a second voice input via the microphone,
        display a second text converted from the second voice input on the touchscreen, display a second reply to the first voice input on the touchscreen, receive a third voice input via the microphone, display a third text converted from the third voice input on the touchscreen, display an application window reflecting the first text, the second text, and the third text on the touchscreen, receive a selection of one of the first text, the second text, and the third text for modification, and display information in the application window to indicate that the selected text was modified, the application window being displayed within a user interface for voice recognition.

19. The mobile terminal of claim 18, wherein the controller is further configured to display an icon for saving the modified text in the application window.

20. The mobile terminal of claim 18, wherein the controller is further configured to save the modified text in response to a fourth voice input received via the microphone.

21. The mobile terminal of claim 18, wherein the controller is further configured to save the modified text, and
wherein the saved text can be viewed by executing an application corresponding to the application window.

22. The mobile terminal of claim 21, wherein the application window is to set a memo or a schedule corresponding to the modified text, and the executed application is a memo application or a schedule application.

23. The mobile terminal of claim 18, wherein the controller is further configured to determine a modification-desired portion of the selected text based on a location of a touch input applied to a text display region of the selected text.

24. The mobile terminal of claim 18, wherein the controller is further configured to:

receive a fourth voice input via the microphone, and modify the selected text in accordance with the fourth voice input.

25. A mobile terminal comprising:

a wireless communication unit configured to wirelessly communicate with at least one other terminal;

a microphone;

a touchscreen; and a controller configured to:

receive a first voice input, a second voice input and a third voice input via the microphone, display a first text, a second text, and a third text converted from the first voice input, the second voice input and the third voice input, respectively, on the touchscreen, display an application window reflecting the first text, the second text, and the third text on the touchscreen, receive a selection of one of the first text, the second text, and the third text for modification, and display information in the application window to indicate that the selected text was modified, the application window being displayed within a user interface for voice recognition.

26. The mobile terminal of claim 25, wherein the controller is further configured to display an icon for saving the modified text in the application window.

27. The mobile terminal of claim 25, wherein the controller is further configured to save the modified text, and
wherein the saved text can be viewed by executing an application corresponding to the application window.

28. The mobile terminal of claim 27, wherein the application window is to set a memo or a schedule corresponding to the modified text, and the executed application is a memo application or a schedule application.

* * * * *